(12) United States Patent
Gauthey et al.

(10) Patent No.: US 7,414,921 B2
(45) Date of Patent: Aug. 19, 2008

(54) PORTABLE ELECTRONIC DEVICE WITH RADIOFREQUENCY SIGNAL RECEIVER AND METHOD FOR DETERMINING THE POSITION OF THE SAME

(75) Inventors: Darryl Gauthey, Yverdon-les-Bains (CH); Anne Montheard, Eclépens (CH)

(73) Assignee: Asulab S.A., Marin (CH)

( * ) Notice: Subject to any disclaimer, the term of this patent is extended or adjusted under 35 U.S.C. 154(b) by 23 days.

(21) Appl. No.: 11/419,132

(22) Filed: May 18, 2006

(65) Prior Publication Data

US 2006/0274605 A1  Dec. 7, 2006

(30) Foreign Application Priority Data

May 18, 2005  (EP)  ................................. 05104207

(51) Int. Cl.
*G04B 47/00*  (2006.01)

(52) U.S. Cl. ............................. 368/10; 368/11; 368/14; 33/349; 33/354; 342/357.06

(58) Field of Classification Search .................. 368/10, 368/11, 14, 46, 47, 76, 80; 33/349, 354, 33/271, 355; 342/357.06, 419, 443, 387
See application file for complete search history.

(56) References Cited

U.S. PATENT DOCUMENTS

| | | | |
|---|---|---|---|
| 5,173,709 A * | 12/1992 | Lauro et al. ................ | 342/443 |
| 5,335,211 A * | 8/1994 | Muto et al. ................. | 368/11 |
| 5,550,794 A * | 8/1996 | Born et al. ................. | 368/11 |
| 5,790,477 A * | 8/1998 | Hauke ........................ | 368/10 |
| 6,032,108 A | 2/2000 | Seiple et al. | |
| 6,184,871 B1 | 2/2001 | Teres et al. | |
| 6,185,157 B1 * | 2/2001 | Farine ........................ | 368/10 |

FOREIGN PATENT DOCUMENTS

| | | |
|---|---|---|
| EP | 0 838 737 A1 | 4/1998 |
| EP | 0 871 096 A1 | 10/1998 |
| EP | 1 170 597 A | 1/2002 |
| WO | 92/21990 | 12/1992 |

(Continued)

OTHER PUBLICATIONS

European Search Report issued in corresponding application No. 05 10 4207, completed Sep. 27, 2005.

(Continued)

*Primary Examiner*—Gary Paumen
(74) *Attorney, Agent, or Firm*—Griffin & Szipl, P.C.

(57) ABSTRACT

The portable electronic device, preferably a wristwatch, includes a radiofrequency signal receiver for receiving, in particular, GPS signals via an antenna, a magnetic compass, a microprocessor data processing unit for processing data provided by the receiver and the compass, and storage means in which almanac and ephemeredes data relating to satellites is stored. The compass is arranged for provide an orientation signal to the data processing device. In this manner, the unit can control means for indicating a direction to indicate a preferred orientation for searching for satellites visible to the user in a reading position of the watch. These indicating means can be formed by the time indicating hands moved above a watch dial. The preferred orientation is calculated by the processing unit on the basis of the almanac and ephemeredes data, time data and the orientation signal.

14 Claims, 4 Drawing Sheets

FOREIGN PATENT DOCUMENTS

WO    2005/017456  A1    2/2005

OTHER PUBLICATIONS

Germiquet, Christophe et al., "Alpinist—Une montre altimete-boussole presentant un nouveau concept d'utilisation," Societe Suisse de Chronometre 64emo Congres—Le Sentier, Sep. 30-Oct. 1, 1999, pp. 15-18.

Exhibit A—Delphion Integrated View, downloaded on Nov. 26. 2007 from www.delphion.com, of EP 0 838 737.

* cited by examiner

PORTABLE ELECTRONIC DEVICE WITH RADIOFREQUENCY SIGNAL RECEIVER AND METHOD FOR DETERMINING THE POSITION OF THE SAME

This application claims priority from European Patent Application No. EP 05104207.5, filed May 18, 2005, the entire disclosure of which is incorporated herein by reference.

FIELD OF THE INVENTION

The invention concerns a portable electronic device, which includes a radiofrequency receiver and a magnetic compass. The device is capable of being worn on a user's wrist, like a wristwatch, so as to provide him with direction or position data. The receiver includes means for receiving and shaping satellite radiofrequency signals and several correlation channels for searching for and tracking several visible satellites. The device also includes a microprocessor data processing unit for processing data provided by the receiver and compass, and storage means. Almanac and ephemeredes data relating to the satellites is also stored in the storage means.

The invention also concerns a method for determining position using an electronic device worn on a user's wrist.

BACKGROUND OF THE INVENTION

The radiofrequency signal receiver of the electronic device can be used for example in a satellite navigation system of the GLONASS or GALILEO or GPS type.

The radiofrequency signal receiver of the electronic device can be of the GPS type, wherein the radiofrequency signal reception and shaping means generate intermediate signals, which are frequency converted for a correlation stage. This correlation stage is composed of several correlation channels for receiving the intermediate signals in order to correlate them with carrier frequency and specific code replicas from satellites to be sought and tracked. Preferably, the receiver can include a larger number of correlation channels than the number of visible satellites for the electronic device worn by a user situated on the Earth.

In the case of a GPS system, any radiofrequency signal receiver can receive GPS signals from satellites in orbit. The ground distance between the receiver and a visible satellite can be between 20,000 km, when one of the satellites is at the zenith, and 26,000 km, when one of the satellites is on a tangent point to the Earth's surface, i.e. on the horizon.

Currently, 30 satellites are placed in orbit at a distance close to 20,200 km above the surface of the Earth on 6 orbital planes each inclined by 55° in relation to the equator. The time taken by a satellite to complete one rotation in obit in order to return to the same point above the Earth is around 12 hours. The distribution of the satellites in orbit allows a terrestrial GPS receiver to receive GPS signals for example from at least four visible satellites in order to determine its position, speed and the local time for example. The GPS message from the GPS signals contains ephemeredes and almanac data used in particular for calculating the X, Y and Z position, speed and local time.

All of this known ephemeredes and almanac data is stored in the storage means of the portable electronic device. Thus, using an approximate known position of the receiver, it is possible to configure said receiver to search and track satellites that should be visible at the moment of search.

In the case of a navigation system, the use of a compass in addition to the radiofrequency signal receiver is known in order to provide the user of the portable device with information regarding the target to be reached.

In this regard, U.S. Pat. No. 5,790,477 can be cited, which discloses a watch provided with a GPS receiver, and a magnetic compass. In this watch, the coordinate points of a geographical target to be reached have to be entered and stored. In order to facilitate the operations for calculating the direction to be followed, the compass provides data relating mainly to geographical north. After processing the GPS signals and the data from the compass, a display device of the watch indicates the direction to be followed to reach the desired target.

In this case the compass is used only for the watch to give information to the user in relation to the direction to take in order to get to the geographical place to reach.

International Patent Application No. WO 92/21990 discloses a portable electronic device as a navigation system direction indicator. In order to do this, the device includes a GPS receiver, and a magnetic compass. The GPS receiver and compass generate signals that are processed by a processing unit in order to provided a direction signal. A display screen of the portable device displays an arrow indicating the direction to be followed in order to reach a selected geographical target.

The magnetic compass of this portable electronic device has no functions other than providing information to the processing unit to enable it to display the direction of the geographical place to be reached.

Since the electronic device of the present invention is worn on a user's wrist, the user's body can form an obstacle to reception of radiofrequency signals from certain visible satellites when the device is in the reading position. This can constitute a drawback if many of the visible satellites to be sought are hidden by the user's body.

It is thus a main object of the invention to provide a portable electronic device provided with a radiofrequency receiver and a compass to assist said receiver in order to overcome the aforementioned drawbacks.

SUMMARY OF THE INVENTION

The invention therefore concerns a portable electronic device cited hereinbefore, which is to be worn on a user's wrist, such as a wristwatch, the device including a radiofrequency signal receiver, which includes means for receiving and shaping radiofrequency signals from satellites and several correlation channels for searching for and tracking several visible satellites, a magnetic compass, a microprocessor data processing unit for processing data provided by the receiver and the compass, and storage means in which the almanac and ephemeredes data relating to the satellites is stored, wherein the compass is arranged for providing an orientation signal to the data processing unit, which controls means for indicating a direction for indicating to the user a preferred orientation for searching for visible satellites when the device is in the reading position on the basis of processing of the almanac and ephemeredes data, time data and the orientation signal by the processing unit.

Advantageous additional apparatus embodiments of the invention are defined as follows. In another apparatus embodiment of the present invention, the portable electronic device is further modified so the processing unit is adapted to automatically configure the receiver on the basis of the orientation signal from the compass for searching for and tracking visible satellites that are not concealed by the user's body in the data reading position of the device. In yet another apparatus embodiment of the present invention, the portable electronic device is modified so that the processing unit is adapted to detect a change in the orientation signal provided by the compass so as to configure or alter the configuration of the receiver for searching for and tracking visible satellites that are not concealed by the user's body as a function of the change in the orientation signal. In still another apparatus embodiment of the invention, the portable electronic device is modified so the compass is of the type with a magnetic flux detector. In another apparatus embodiment of the invention, the portable electronic device is modified so that touch type keys are arranged on a watch glass for controlling the various functions of the device in a position determining mode, wherein the touch type keys are controlled by the processing unit.

In accordance with another apparatus embodiment of the invention, the portable electronic device is an electromechanical wristwatch with a time display using hands such that the device includes a radiofrequency signal receiver, which includes means for receiving and shaping radiofrequency signals from satellites and several correlation channels for searching for and tracking several visible satellites, a magnetic compass, a microprocessor data processing unit for processing data provided by the receiver and the compass, and storage means in which the almanac and ephemeredes data relating to the satellites is stored, wherein the compass is arranged for providing an orientation signal to the data processing unit, which controls means for indicating a direction for indicating to the user a preferred orientation for searching for visible satellites when the device is in the reading position on the basis of processing of the almanac and ephemeredes data, time data and the orientation signal by the processing unit, wherein in a position determining mode, the means for indicating a direction are formed by at least one of the time indicating hands of the device which is moved to indicate the preferred orientation for the receiver to search for visible satellites.

In accordance with another apparatus embodiment of the invention, the portable electronic device that is an electromechanical wristwatch is modified so that in the position determining mode, two time indicating hands are controlled by the processing unit to superpose each other or to be in opposition to indicate a preferred orientation, or to indicate the direction of a satellite or geographical north. In accordance with still another apparatus embodiment of the invention, the portable electronic device that is an electromechanical wristwatch is modified so that the direction indicating means include a liquid crystal display module controlled by the processing unit in order to display various data relating in particular to orientation or positioning in a position determining mode, and wherein the device includes a control button, which can be activated manually to pass from a time display mode into a position determining mode.

One advantage of the electronic device worn on a user's wrist according to the invention lies in the fact that it provides the user with an indication of a preferred orientation in relation to his body for a better visible satellites search when the device is in the reading position. If the user turns at an angle defined by the preferred orientation indication when he is in the device reading position, the receiver is then able to search for and track a larger number of visible satellites. Consequently, he reduces the number of visible satellites capable of being hidden by his body in the device reading position, and facilitates determination of the receiver's position.

Advantageously, the electronic device is an electromechanical wristwatch with a time display using hands. Thus, the processing unit is able to configure the radiofrequency signal receiver, such as a GPS receiver, on the basis of almanac and ephemeredes data, time data and the orientation signal provided by the compass.

In a position determination mode, when the radiofrequency signal receiver is switched on, the hands are superposed or opposite each other in order to indicate, on the watch dial, the preferred direction for the receiver to pick up a maximum number of visible satellites. The hands can also be moved to indicate a range in which there is a maximum number of visible satellites capable of being sought and tracked.

The radiofrequency signal receiver can be automatically configured by the processing unit as a function of the direction taken by the user in the device reading position so as to only search for and track the visible satellites that are not hidden by the user's body.

Advantageously, any rotation or change of direction by the user is detected by the processing unit on the basis of a change in the orientation signal provided by the compass. As a function of the rotation of the user in the device reading position, the receiver can be configured or reconfigured automatically for searching for and tracking other visible satellites.

It is also an object of the invention to propose a method for determining position using an electronic device worn on a user's wrist that overcomes the drawbacks cited hereinbefore.

The invention therefore concerns a method for determining position using an electronic device cited hereinbefore, which is a method for determining a position using an electronic device worn on a user's wrist, the device including a radiofrequency receiver, which includes means for receiving and shaping radiofrequency signals from satellites and several correlation channels for searching for and tracking visible satellites, a magnetic compass, a microprocessor data processing unit for processing data provided by the receiver and the compass, and storage means in which almanac and ephemeredes data relating to satellites is stored, wherein said method includes steps of: (a) providing an orientation signal from the compass to the processing unit, (b) processing the orientation signal in the processing unit with the almanac and ephemeredes data of the storage means, and time data, and (c) indicating on direction indicating means, which are controlled by the processing unit, a preferred orientation for searching for satellites visible to the user when the device is in the reading position on the basis of the data processed by the processing unit.

Particular steps of the method are further defined in other embodiments of the invention. For example, the above method embodiment of the present invention may be further modified to include a step consisting in automatically configuring the radiofrequency signal receiver via the processing unit on the basis of the orientation signal provided by the compass, so that the receiver is able to search for and track visible satellites that are not concealed by the user's body when the device is in the data reading position. In another method embodiment of the invention, the method is further modified so that the processing unit detects a change in orientation of the device worn by the user on the basis of a change in the orientation signal provided by the compass, so as to configure or alter the configuration of the receiver for searching for and tracking visible satellites that are not concealed by the user's body.

In another method embodiment of the invention, the method is further modified so that the device is an electromechanical wristwatch with a time display using hands, wherein when a position determining mode is selected by actuating a control button of the device, the hands for indicating a direction are moved to indicate the preferred orientation for the receiver to search for visible satellites. In still another method embodiment of the invention, the method is further modified so that the device is an electromechanical wristwatch with a time display using hands, wherein when a position determining mode is selected by actuating a control button of the device, the hands for indicating a direction are moved to indicate the preferred orientation for the receiver to search for visible satellites, and in the position determining mode, the hands are superposed or in opposition to indicate the preferred orientation, and wherein the device worn by the user is rotated at a determined angle corresponding to the preferred orientation in order to bring at least one of the hands to the 12 o'clock indication of a watch dial so that the processing unit configures the receiver to search for and track a maximum number of visible satellites.

BRIEF DESCRIPTION OF THE DRAWINGS

The objects, advantages and features of the portable electronic device and the position determining method using the electronic device will appear more clearly in the following description with reference to the drawings, in which.

DETAILED DESCRIPTION OF THE INVENTION

In the following description, reference will be made only to a wristwatch as the portable electronic device able to be worn on a user's wrist. Several elements of this wristwatch, which are well known to those skilled in the art in this technical field, are described only in simple manner. Of course, any device other than a wristwatch could be envisaged, such as a bracelet or wristband with electronic components, or a portable telephone provided it is possible for it to be worn on the wrist or held in the hand during the operations for determining a geographical position.

Figure 1:
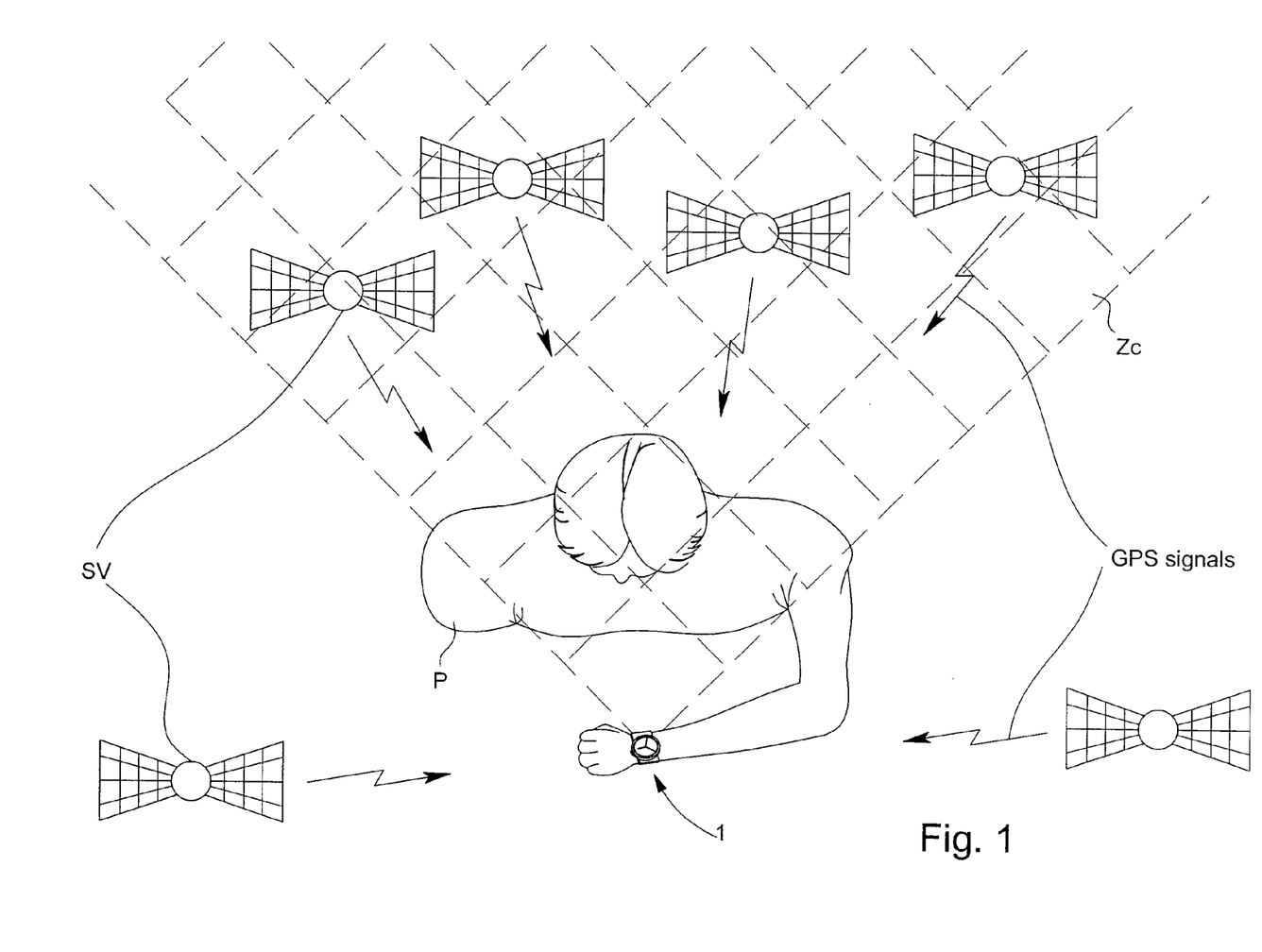
FIG. 1 shows a simplified top view of a user wearing an electronic device according to the invention in the reading position of said device for determining for example a geographical position, where part of the visible satellites are hidden by his body.

As shown in FIG. 1, in position determining mode, wristwatch 1, which includes a radiofrequency signal receiver particularly of the GPS type and a magnetic compass, is placed in front of the user P. In this mode, because of the receiver, the watch is able to determine a geographical position, a speed, an altitude or a heading. This watch dial is substantially placed horizontal in this position for reading data provided by the watch worn on the user's wrist or held in his hand. This enables the axis of the receiver antenna to be placed vertically to determine for example its geographical position as described hereinafter with reference to FIG. 3.

By placing the watch in front of him, the user blocks out a part of the field of vision of the GPS system. A zone Zc, shown in hatched lines, of the field of vision at an angle of around 90° from the watch, is concealed by the user's body P. Consequently, certain visible satellites SV having for example a low elevation and capable of providing GPS signals to be picked up by the receiver are concealed by the user's body P.

In order to determine a geographical position, it is normally necessary to be able to pick up at least three visible satellites. FIG. 1 shows that the GPS signals from only two satellites can be picked up by the receiver of the device. Consequently, the user has to be informed by the watch of a preferred orientation of his watch in relation to his body in order for it to be able to pick up the GPS signals from a sufficient number of visible satellites.

Since the watch includes storage means which store almanac and ephemeredes data relating to the satellites, and since it knows the date, hour and approximate position of the user, the watch with the receiver is able to determine the relative position of the visible GPS satellites able to be picked up. The receiver can thus be automatically configured by a microprocessor processing unit to search for and track visible satellites SV that are not concealed by the user's body.

Figure 2:
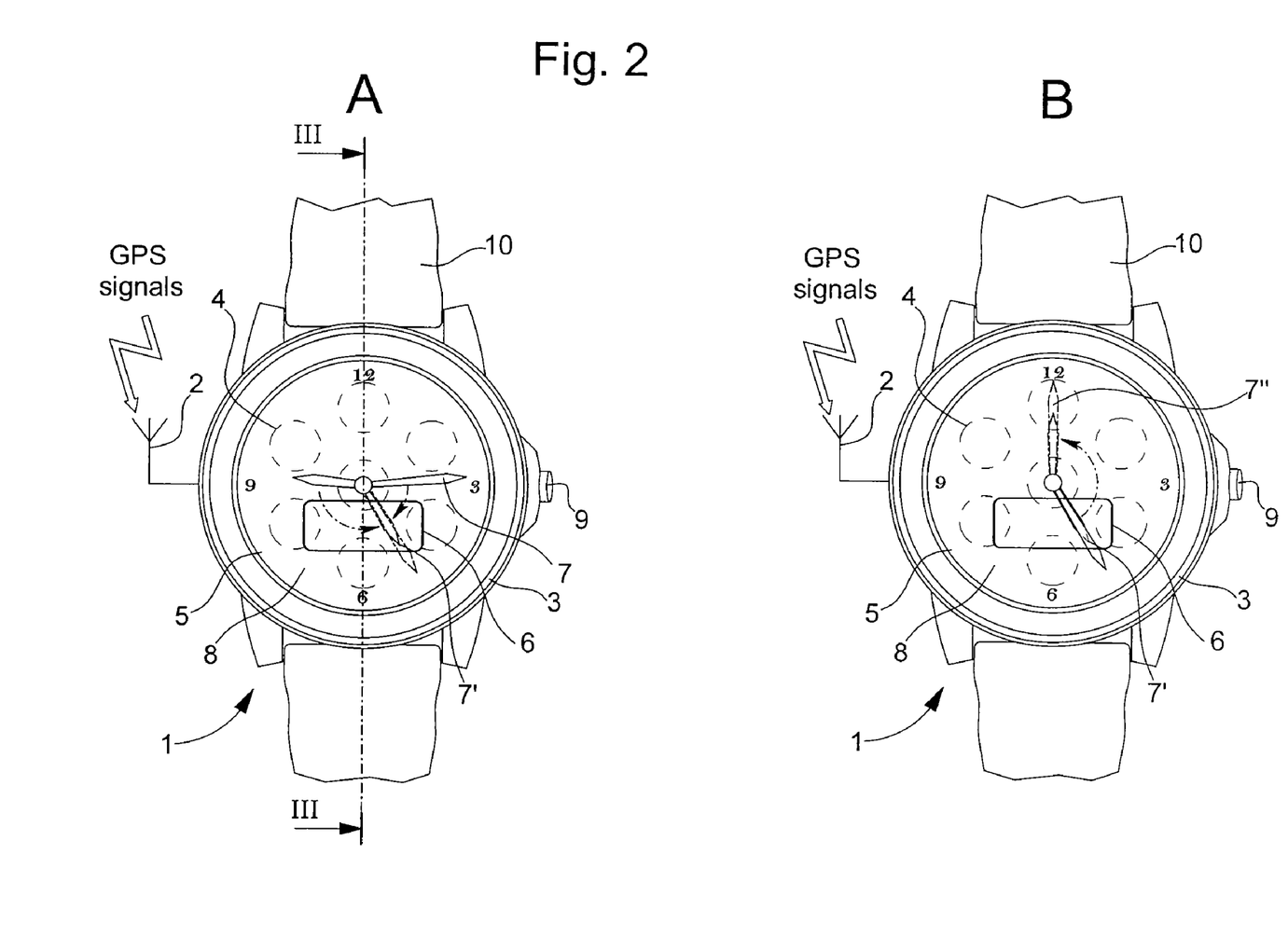
FIG. 2 shows a top view of a wristwatch as a portable electronic device according to the invention, to show in plane A the movement of the time indicating hands at a relative position of a preferred orientation, and in plane B the movement of the hands when the user wearing the device rotates.

FIG. 2 shows only top views of electromechanical watch 1, which is normally worn on the user's wrist (not shown) in a position in which the watch data can be read.

Watch 1, which includes a wristband 10, is of the analogue type with a dial 8 and hands 7 for indicating the time. The watch also includes a watch movement arranged underneath dial 8 in a case 3 closed by a glass 5, a liquid crystal display module or device 6 for displaying data or operations to be carried out, control keys 4 on the inner surface of the glass and a control button 9 on the case. Glass 5 is held by a bezel or by a top part of the middle part of case 3. A battery or accumulator, not shown, in case 3 supplies electric power to the electronic components of the watch.

The control keys 4 are preferably capacitive type sensors which can each be activated by a user's finger or a stylus, not shown, placed in a determined zone of the sensor to be activated. At least one, preferably transparent, sensitive pad forms each sensor or control key.

Watch 1 also includes a radiofrequency signal receiver, whose antenna 2 of the radiofrequency signal reception and shaping means is symbolically represented, and a magnetic compass for assisting the receiver.

In a normal operating mode, wristwatch 1 will provide time data via hands 7, or also using display module 6. In this normal mode, the radiofrequency signal receiver remains in an inactive rest mode as an electric energy saving measure.

However, for determination of a geographical position, the radiofrequency signal receiver must be switched on. In order to do this, the control button 9 can be pressed manually briefly or for a determined time in order to enter position determining mode. In this position determining mode, the control keys, controlled by the processing unit, become active so that various watch data and calculated position coordinates can be consulted on display module 6.

Control button 9 could also enable, first of all, control keys 4 to be switched on so that via the action of one or several control keys, the position determination mode is then selected by switching on the receiver. The control keys can also be activated by a user's finger to consult various menus or stored data, or to execute various functions or operations of the watch.

From this moment, when the wristwatch is placed in a reading position in front of the user as shown in FIG. 1, the magnetic compass provides an orientation signal to the processing unit. This orientation signal tells the processing unit which satellites are concealed by the user's body. Thus, owing to the time data, the orientation signal and the stored satellite almanac and ephemeredes data, the processing unit can automatically configure the receiver to search for and track visible satellites not concealed by the user's body.

In this position determining mode, hands 7 form part of the direction indicating means of the watch. They are moved in rotation upon the command of the processing unit to superpose each other as shown in dotted lines with the reference 7' in plane A of FIG. 2. The position 7' of the hands in this mode provides an indication of the preferred orientation to be adopted by the user to pick up the largest number of visible satellites not concealed by his body.

Since in plane A of FIG. 2, the superposed hands are moved in proximity to the 6 o'clock indication of the watch dial, this informs the user that a large number of visible satellites capable of being picked up by the watch receiver are concealed by his body. If the user does not rotate, the processing unit configures the receiver to pick up only the visible satellites that are not concealed. Position determination can thus be calculated provided that the GPS signals from at least three signals can be picked up.

Of course, it is possible for hands 7 to be placed in opposition in this position determining mode, or for only one hand to be moved. Moreover, via manual action on one or other of control keys 4, one hand could be selected to indicate geographical north or the position of one of the satellites in orbit.

In order to be able to pick up the maximum number of visible satellites when the user places his watch in front of him in the data reading position, he has to turn at an angle corresponding to the angle defined by the hands in the position referenced 7' and the 12 o'clock indication of the watch dial for example along plane B of FIG. 2. Via this rotation and change in the orientation signal provided by the compass, the superposed hands are moved to the 12 o'clock indication of the dial shown by the reference 7" in dotted lines. Once the hands occupy the 12 o'clock position, the processing unit can automatically or at the user's request configure the receiver to search for and track visible satellites that are not concealed by his body.

It should be noted that the processing unit detects any significant change in the user's orientation. Thus, the unit can reconfigure the receiver in operation to search for and track other visible satellites. Moreover, the direction indication means also include the display module 6, which can display geographical position coordinates or the position coordinates of at least one visible satellite or any other data stored in the storage means of the watch.

Figure 3:
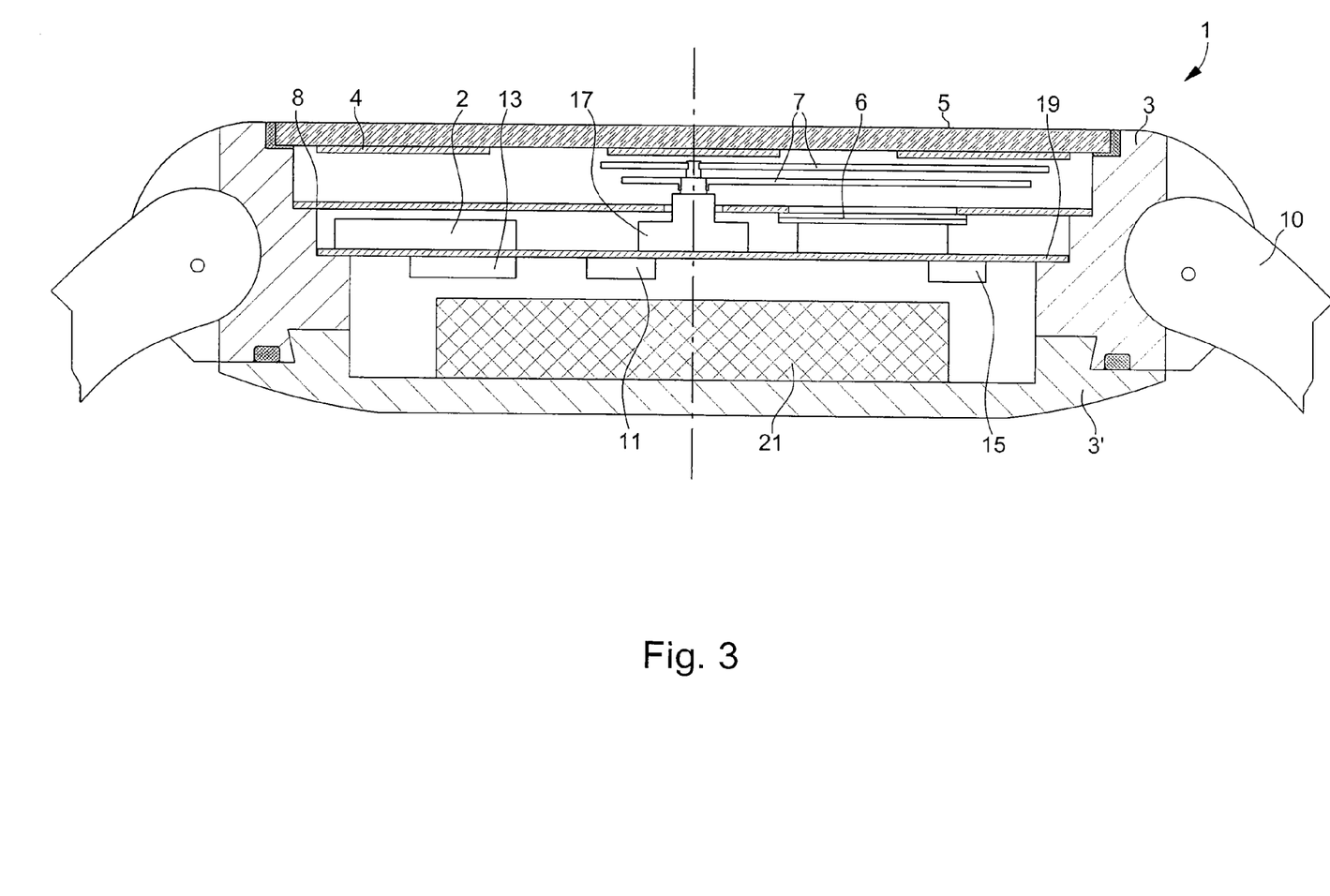
FIG. 3 shows schematically a partial cross-section along III-III of the wristwatch of FIG. 2.

FIG. 3 shows schematically a cross-section of wristwatch 1 along the line III-III of FIG. 2. To prevent overloading the watch seen in cross-section, only the important components of the watch and their place in the watchcase are shown.

Wristwatch 1 includes in particular a microprocessor processing unit 11 programmed to execute certain personalised functions, for example for calculating position on the basis of data provided by receiver 13. Receiver 13 includes means for receiving via an antenna 2 and shaping the radiofrequency signals from the satellites, and several correlation channels for searching for and tracking several visible satellites. The number of correlation channels is preferably greater than the number of visible satellites, for example equal to 12 channels.

Microprocessor unit 11 also includes certain blocks relating to the time base for controlling a micromotor 17 driving time indicating hands 7 on watch dial 8. An oscillator stage connected to a quartz resonator is arranged in microprocessor unit 11 for clocking various operations of the watch with the radiofrequency signal receiver 13.

The oscillation frequency can be of the order of 4.03 MHz. This oscillation frequency can also be divided in a known manner to obtain a clock frequency at 32768 Hz in order to clock the horological functions. Another quartz resonator could also be added for an oscillator stage at an oscillation frequency of 32768 Hz for the horological functions of the watch.

Microprocessor unit 11 can be for example the 8-bit PUNCH microprocessor or the 8-bit CoolRISC-816 microprocessor manufactured by EM Microelectronic-Marin SA in Switzerland.

Wristwatch 1 further includes in the case, which is formed of middle part 3 and back cover 3' mounted in a known manner in middle part 3, and which is closed by glass 5, a magnetic compass 15 connected to a printed circuit board 19. The magnetic compass can be a mechanical compass or a compass based on the magnetic principle flux detection (Fluxgate). The compass is arranged on printed circuit board 19 on the same side as processing unit 11 and receiver 13 so that the processing unit can be easily electrically connected to the compass and receiver. However, antenna 2 of receiver 13 is arranged on an opposite side of the printed circuit board sufficiently far away from the magnetic compass to avoid any signal disturbance between the two elements. The antenna axis is substantially perpendicular to printed circuit board 19 which is held on an inner edge of middle part 3 of the watch beneath dial 8.

Wristwatch 1 also includes an accumulator or battery 21 of small size, arranged on back cover 3' of the watchcase to supply electricity to all of the watch components, an LCD display module or device 6 mounted on printed circuit board 19 so as to appear through an aperture of the dial. On an inner surface, watch glass 5 includes transparent sensitive pads 4 of the control keys, which are electrically connected to processing unit 11.

Once the control button, which is not shown, is pressed for example, control keys 4 of the tactile screen can be activated to provide signals to microprocessor unit 11. 7 control keys can be provided for example, whose sensitive pads are spaced sufficiently far apart from each other to allow the user's finger to activate them individually.

In a position determining mode, the signals from keys 4 can select various menus or data to be displayed on display module 6, or can allow processing unit 11 to configure receiver 13 to search for and track visible satellites.

For complementary technical details as to the arrangement of the sensitive pads and the electronic components of watch 1, the reader can refer to EP Patent No. 0 838 737 in the name of the same Applicant and to points 2 and 5 of the publication of 30 Sep. 1999 at the 64$^{th}$ Congress of the Swiss Chronometry Society entitled "Montre altimètre-boussole présentant un nouveau concept d'utilisation" by Asulab S. A. which are incorporated herein by way of reference. U.S. Pat. No. 6,184,871 is the U.S. patent equivalent of EP Patent No. 0 838 737, and U.S. Pat. No. 6,184,871 is likewise incorporated herein by reference.

Figure 4:
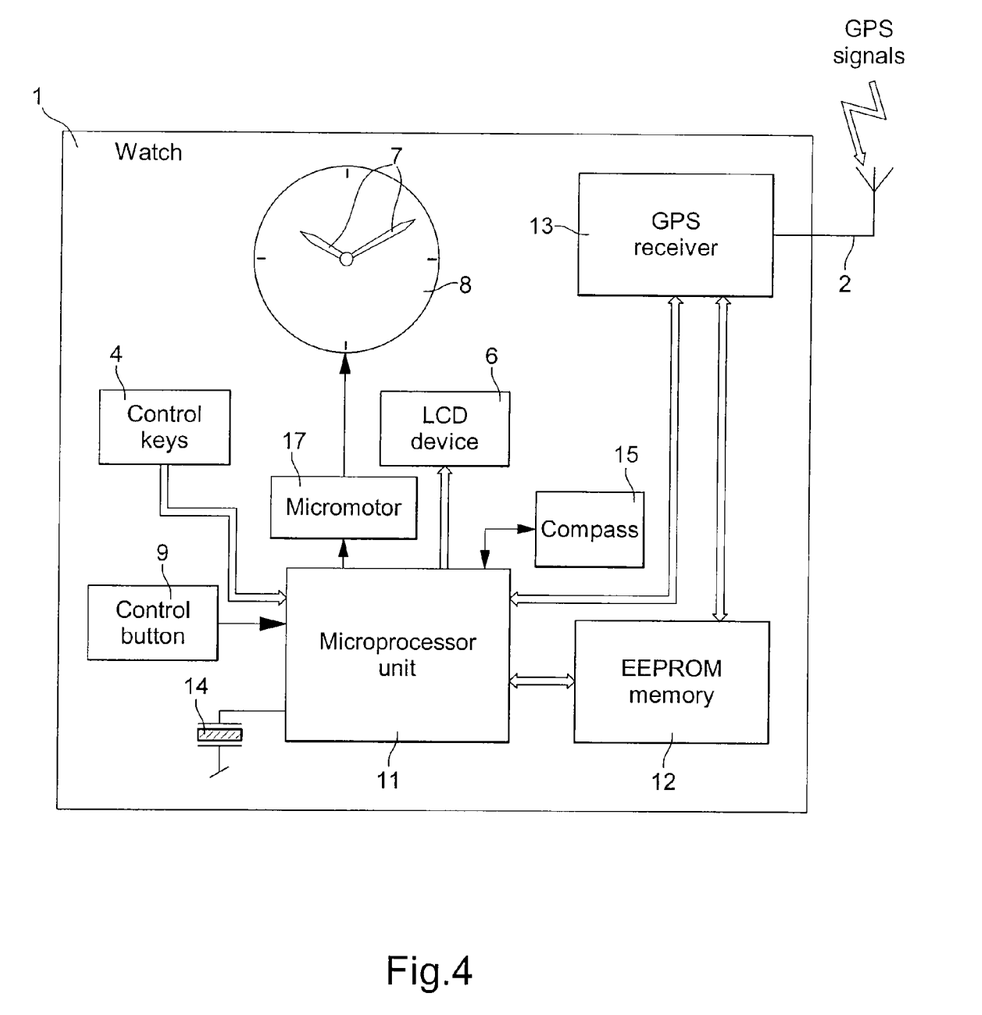
FIG. 4 shows schematically various electronic blocks of the wristwatch as the portable electronic device according to the invention.

FIG. 4 shows schematically the various electronic elements of wristwatch 1. It should be noted that those elements of wristwatch 1 described in FIGS. 2 and 3 that are the same bear identical reference numerals. Thus, for the sake of simplification, the description of each element will not be repeated.

The wristwatch thus includes a microprocessor processing unit 11, a magnetic compass 15 connected to microprocessor processing unit 11, a quartz resonator 14 of a stage oscillator of the processing unit, a GPS receiver 13 provided with an antenna 2 for receiving GPS signals and connected to the processing unit, a display device 6 controlled by the processing unit. Watch 1 further includes a micromotor 17 controlled by the processing unit in order to drive hands 7 above a watch dial 8, control keys 4 and a control button 9 connected to the processing unit to order certain functions to be carried out.

The storage means of watch 1 are preferably formed by a non-volatile EEPROM memory 12. This memory is connected to processing unit 11 and also to receiver 13 so as to store data transmitted by the unit or the receiver. Memory 12 can also provide stored almanac and ephemeredes data relating to the satellites. This enables microprocessor unit 11 to determine which visible satellites are capable of being picked up, by processing this almanac data with the time data and the compass orientation signal.

Processing unit 11 controls micromotor 17 such that hands 7 indicate a preferred orientation in the position determining mode. Moreover, processing unit 11 configures the radiofrequency signal receiver 13 so that certain correlation channels of the receiver are able to search for and track visible satellites that are not concealed by the user's body.

Of course, the GPS radiofrequency signal receiver can be made like the receiver disclosed, in particular, in EP Patent Application No. 1 170 597 by the same Applicant. In such case, each correlation channel of the receiver can include a controller for execution of the search and tracking operations for a given visible satellite, and other data storage means.

At the end of all of the position determining steps of the wristwatch, the receiver is automatically placed in a rest mode after a determined period of inactivity in order to save electric energy.

From the description that has just been given, those skilled in the art can devise multiple variants of the portable electronic device and the position determining method without departing from the scope of the invention defined by the claims. The radiofrequency signal receiver of the device can also be used in a GLONASS or GALILEO navigation system or another navigation system. Moreover, the direction indicating means can be formed by an acoustic device to inform the user of a preferred orientation for picking up a large number of visible satellites that are not concealed. The preferred orientation can be indicated only on the display module of the electronic device. In a determined position of the user, the channels of the receiver configured for searching for satellites, which are concealed by the user's body, are switched off to save energy.

The invention claimed is:

1. A portable electronic device to be worn on a user's wrist, the device comprising:
   (a) a radio frequency signal receiver that includes
      i. means for receiving and shaping radio frequency signals from satellites and several correlation channels for searching for and tracking several visible satellites;
      ii. a magnetic compass;
      iii. a microprocessor data processing unit for processing data provided by the receiver and the compass; and
      iv. storage means in which almanac and ephemeredes data relating to satellites are stored, wherein the compass is arranged to provide an orientation signal to the data processing unit that controls means for indicating a direction for indicating to the user a preferred orientation for searching for visible satellites when the device is in a reading position on the basis of processing, by the processing unit, of almanac and ephemeredes data, time data and the orientation signal.

2. The portable electronic device according to claim 1, wherein the processing unit is adapted to automatically configure the receiver on the basis of the orientation signal from the compass for searching for, and tracking, visible satellites that are not concealed by the user's body in the data reading position of the device.

3. The portable electronic device according to claim 1, wherein the processing unit is adapted to detect a change in the orientation signal provided by the compass so as to configure or alter the configuration of the receiver for searching for, and tracking, visible satellites that are not concealed by the user's body as a function of change in the orientation signal.

4. The portable electronic device according to claim 1, wherein the compass comprises a magnetic flux detector.

5. The portable electronic device as an electromechanical wristwatch with a time display using hands according to claim 1, wherein in a position determining mode, the means for indicating a direction are formed by at least one of the time indicating hands of the device which is moved to indicate the preferred orientation for the receiver to search for visible satellites.

6. The portable electronic device according to claim 5, wherein in the position determining mode, two time indicating hands are controlled by the processing unit to superpose each other or to be in opposition to indicate a preferred orientation, or to indicate the direction of a satellite or geographical north.

7. The portable electronic device according to claim 5, wherein the direction indicating means include a liquid crystal display module controlled by the processing unit in order to display various data relating to orientation or positioning in a position determining mode, and wherein the device includes a control button that is activated manually to pass from a time display mode into a position determining mode.

8. The portable electronic device according to claim 1, wherein touch type keys are arranged on a watch glass for controlling the various functions of the device in a position determining mode, said touch type keys being controlled by the processing unit.

9. The portable electronic device according to claim 1, wherein the device is a wristwatch.

10. A method for determining a position using an electronic device worn on a user's wrist, the device comprising a radio frequency receiver that includes means for receiving and shaping radio frequency signals from satellites and several correlation channels for searching for and tracking visible satellites, a magnetic compass, a microprocessor data processing unit for processing data provided by the receiver and the compass, and storage means in which almanac and ephemeredes data relating to satellites is stored, wherein the method includes steps of:
   (a) providing an orientation signal from the compass to the processing unit;
   (b) processing the orientation signal in the processing unit with the almanac and ephemeredes data of the storage means, and time data; and
   (c) indicating on direction indicating means that is controlled by the processing unit, a preferred orientation for searching for satellites visible to the user when the device is in a reading position on the basis of data processed by the processing unit.

11. The method according to claim 10, further comprising a step consisting in automatically configuring the radio frequency signal receiver via the processing unit on the basis of the orientation signal provided by the compass so that the receiver is able to search for and track visible satellites that are not concealed by the user's body when the device is in the reading position.

12. The method according to claim 10, wherein the processing unit detects a change in orientation of the device worn by the user on the basis of a change in the orientation signal provided by the compass so as to configure or alter the configuration of the receiver for searching for, and tracking, visible satellites that are not concealed by the user's body.

13. The method according to claim 10, wherein the device is an electromechanical wristwatch with a time display using hands, wherein when a position determining mode is selected by actuating a control button of the device, the hands operate to indicate a direction by moving to indicate a preferred orientation for the receiver to search for visible satellites.

14. The method according to claim 13, wherein in the position determining mode, the hands are superposed or in opposition to indicate the preferred orientation, and the device worn by the user is rotated at a determined angle corresponding to the preferred orientation in order to bring at least one of the hands to the 12 o'clock indication of a watch dial so that the processing unit configures the receiver to search for and track a maximum number of visible satellites.

* * * * *